US009487171B2

(12) United States Patent
Rogers et al.

(10) Patent No.: US 9,487,171 B2
(45) Date of Patent: Nov. 8, 2016

(54) TELESCOPING SIDE UNDER-RIDE GUARD FOR SLIDING AXLE TRAILER

(71) Applicants: Patrick Keith Rogers, Fayetteville, AR (US); Stephen Allen Batzer, Fife Lake, MI (US)

(72) Inventors: Patrick Keith Rogers, Fayetteville, AR (US); Stephen Allen Batzer, Fife Lake, MI (US)

( * ) Notice: Subject to any disclaimer, the term of this patent is extended or adjusted under 35 U.S.C. 154(b) by 180 days.

(21) Appl. No.: 14/598,619

(22) Filed: Jan. 16, 2015

(65) Prior Publication Data
US 2016/0207484 A1    Jul. 21, 2016

(51) Int. Cl.
*B60R 19/56* (2006.01)
(52) U.S. Cl.
CPC .................. *B60R 19/565* (2013.01)
(58) Field of Classification Search
CPC ..................... B60R 19/565; B60R 19/56
USPC ........................ 293/128; 296/180.4
See application file for complete search history.

(56) References Cited

U.S. PATENT DOCUMENTS

| 2,002,832 | A  | 5/1935  | Robinson |
| 4,060,268 | A  | 11/1977 | Page |
| 6,450,556 | B1 | 9/2002  | Jacobs |
| 6,626,475 | B2 | 9/2003  | Schroeder |
| 7,086,674 | B2 | 8/2006  | Goertz |
| 7,188,875 | B2 | 3/2007  | Norelius |
| 7,407,204 | B2 | 8/2008  | Eriksson |
| 7,780,224 | B2 | 8/2010  | Roush |
| 7,967,349 | B2 | 6/2011  | Puppini |
| 8,162,384 | B2 | 4/2012  | Giromini |
| 2008/0116702 | A1 | 5/2008 | Enz |

FOREIGN PATENT DOCUMENTS

| FI | EP 2301811 A1 * | 3/2011 | .......... B60R 19/565 |
| FR | WO 2014083376 A1 * | 6/2014 | .......... B60R 19/565 |

OTHER PUBLICATIONS

Bloch, et al. "Improved Crashworthy Designs for Truck Underride Guards," 1998 Enhanced Safety of Vehicles Conference, Paper No. 98-S4-O-07, 1998, pp. 833-846, NHTSA, USA.
Trego, et al., "A Scientific Approach to Tractor-Trailer Side Underride Analysis," Society of Automotive Engineers Paper No. 2003-01-0178, 2003, USA.
Cofone Joseph, "Automobile/Tractor-Trailer Side Underride Crash Tests," Accident Reconstruction Journal, vol. 21, Mar. 2011, pp. 21-26, USA.
Padmanaban, Jeya, "Estimating Side Underride Fatalities Using Field Data," 57th AAAM Annual Conference Annals of Advances in Automotive Medicine, Sep. 22-25, 2013, pp. 225-232, USA.

* cited by examiner

*Primary Examiner* — Pinel Romain

(57) ABSTRACT

A side under-ride collision guard is described configured to be mounted on a large trailer equipped with a sliding rear axle, comprising at least two linear fixed energy absorbing beam structures mounted axially with the trailer and attached to a plurality of support members connecting the beam structures to opposing ends of the trailer's floor beams, and at least two linear telescoping beam structures axially adjustable for position with respect to the fixed beam structures. The guard diminishes the impact hazard to other roadway users that is presented by the lower axial edge(s) of the cargo compartment in the two outboard regions that exist between the trailer's protected regions, which are typically the landing legs or prime mover rear tires to the front and the trailer's sliding axle assembly to the rear of the trailer.

18 Claims, 5 Drawing Sheets

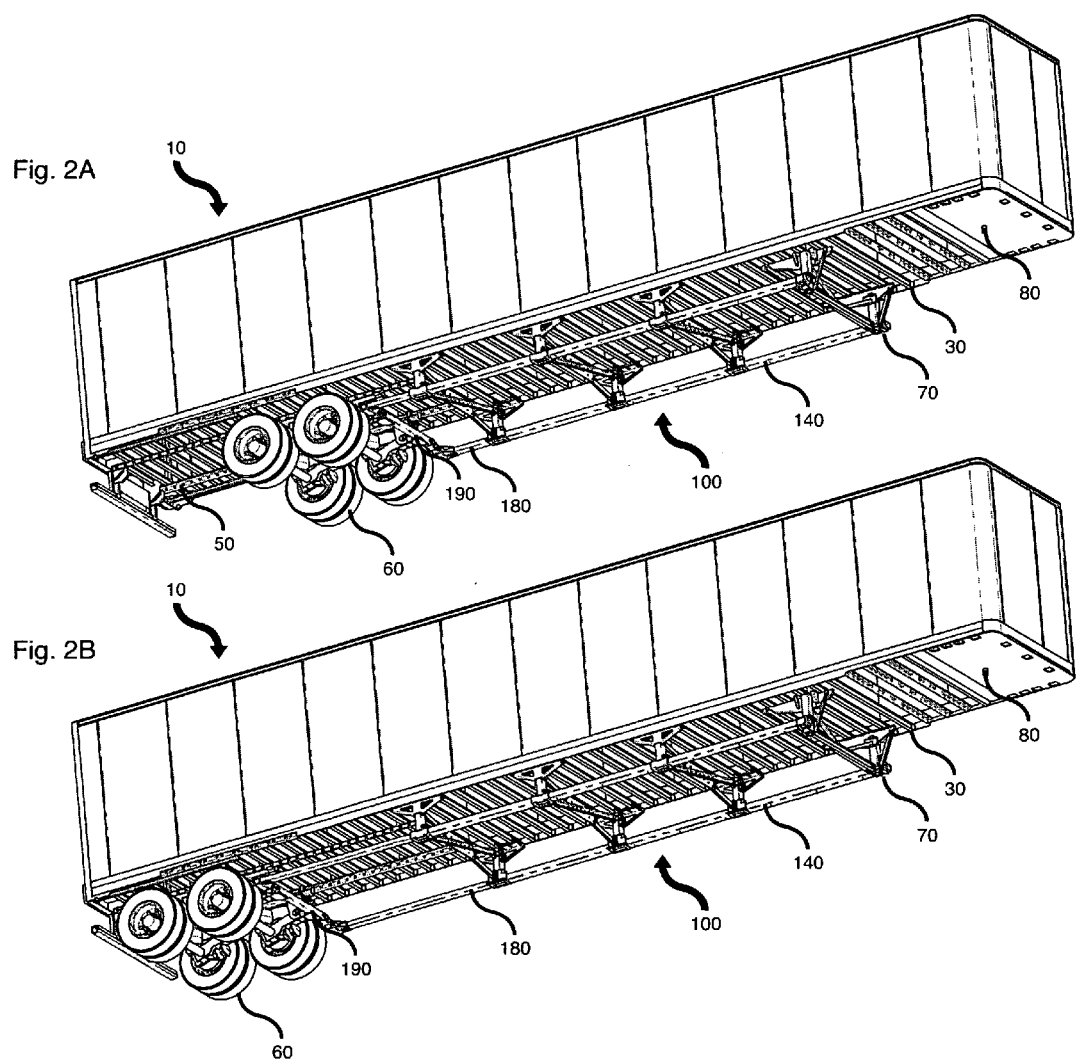

TELESCOPING SIDE UNDER-RIDE GUARD FOR SLIDING AXLE TRAILER

CROSS-REFERENCE TO RELATED APPLICATIONS

None

BACKGROUND OF THE INVENTION

The recognized hazard of side collisions against towed trailers can be traced back at least to 1938 in which Robinson invented a peripheral guard for a hitch-mounted trailer. See U.S. Pat. No. 2,002,832. His patent teaches a fixed full periphery guard for a towed trailer with fixed rear axle. This non-adjustable system thus guarded against impacts to the trailer from all directions.

Page envisioned a more limited guard in U.S. Pat. No. 4,060,268. His device was designed for a large trailer with the front of the trailer attaching to a substantially horizontal "fifth wheel" of the tractor vehicle. This articulated structure, comprising prime-mover and towed load, represents the consensus design for commercial cargo transport on U.S. highways today. In this concept, the compartmentalized cargo space is fully above the trailer's axle assembly. The weight of the transported goods is supported both by the trailer tires at the trailer's rear, and by the prime-mover's rear tires directly underneath the front of the trailer. The Page patent teaches a generally rectilinear rail guard and support system guarding the space between the prime-mover's rear tires and the trailer's rear-situated duals. The guard is adjustable for height but not length, such that sufficient clearance exists to prevent scraping of the guard against the roadway. This system does not contemplate a sliding rear axle system, and thus no region is unprotected between the region forward of the trailer's tires and rearward of the side under-ride guard.

Jacobs proposed a dynamic inflatable under-ride guard in the form of an exterior airbag and crash sensing system in U.S. Pat. No. 6,450,556. The purpose of this system is to absorb the impacting vehicle's kinetic energy and prevent under-ride, diminishing the hazard to the impacting vehicle. This patent teaches a plurality of systems, one for the rear, and at least one for each side between the trailer dual rear axles and the prime movers tires to the front of the trailer.

Schroeder developed a fixed side guard system for sliding axle trailers which provided a conventional mechanical guard for the majority of the length of the trailer between the trailer tires and the prime mover tires. See U.S. Pat. No. 6,626,475. This system of rectangular bars is adjustable for the movement of the rear trailer suspension, but unlike the Page-designed guard, the Schroeder guard was manually adjustable for axial length, but not height.

Goertz invented an energy absorbing rear under-ride guard that absorbed the kinetic energy of the impacting vehicle through guard rotation in U.S. Pat. No. 7,086,674. In this mechanism, the interacting guard rail is designed to pivot about an axle and resist the impacting force as it displaces from its rearmost position to a more forward position. Within the patent, Goertz describes how this rear guard can be adapted to the side locations forward of the trailer's axle assembly in discrete segments. Thus, the Goertz device does not include an adjustment mechanism and cannot fully address geometric mismatch if a sliding trailer axle is used.

Norelius designed a side impact guard for lorries (box trucks) which present similar impact hazards to passenger vehicles as do articulated trailers. See U.S. Pat. No. 7,188,875. The Norelius invention is adjustable for user access to the underside of the vehicle. In this invention, a stiff sheet unit mostly fills the void space between the lorry's steering tires to the front of the load bearing rear tires. The rectangular guard taught in the patent protects the occupants of impacting vehicles. One novel function described was the ability for the guard to rotate upwards and out of the way when access to the underside of the vehicle was desired. The lorry described in the preferred embodiment has no sliding axle capability, and thus no space behind the rear tires requiring guarding against transverse passenger vehicle impact.

Eriksson patented a conventional side guard for trucks that had the added functionality of acting as a support structure for aerodynamic fairings in U.S. Pat. No. 7,407,204. This non-adjustable guarding structure is for the region between the steer tires to the front and the drive tires to the rear, with no allowance for adjustment, as none is recognized to be necessary with fixed rear axle locations.

Roush invented a crash attenuating under-ride guard that provided a three-dimensional complex aerodynamic surface structure, unlike the generally planar structures of previous inventions. See U.S. Pat. No. 7,780,224. An inherent function of this design is increased fuel efficiency. The invention incorporates a complex, sculptured surface and does not envision adjustability for a sliding rear axle assembly in any of the preferred embodiments.

Puppini developed a longitudinal impact system for trailers and semi-trailers by creating a novel storage container for spare tires that also provided protection for vehicles that impact the trailer laterally in U.S. Pat. No. 7,967,349. As many trailers carry spare tires pre-mounted on wheels, a component is already present which, through novel containerization, could provide a crashworthiness safety benefit. This system is not adjustable and provides a low weight penalty crashworthiness benefit.

Finally, in U.S. Pat. No. 8,162,384, Giromini teaches an adjustable side under-ride trailer system with cables instead of the rigid guards and inflatable airbags taught previously. This design is energy absorbing, distributing the load of the impacting vehicle throughout all of the impacted cables. The invention also uses springs to increase the compliance of the cables thus providing a transverse-impact resistance function. The Giromini invention is not adjustable to protect the region forward of the trailer's rear axle assembly if the axle assembly is in the rearmost position.

BRIEF SUMMARY OF THE INVENTION

A side under-ride guard system for a sliding axle trailer that includes a fixed guard segment forward of the axle assembly and a telescoping adjustable guard segment that bridges the space between the fixed guard and the leading edge of the axle assembly.

BRIEF DESCRIPTION OF THE DRAWINGS

FIGS. 2A and 2B show oblique schematic views of the inventive telescoping side under-ride guard system with the axle assembly in the forward and rearward positions.

DETAILED DESCRIPTION OF THE INVENTION

Figure 1A:
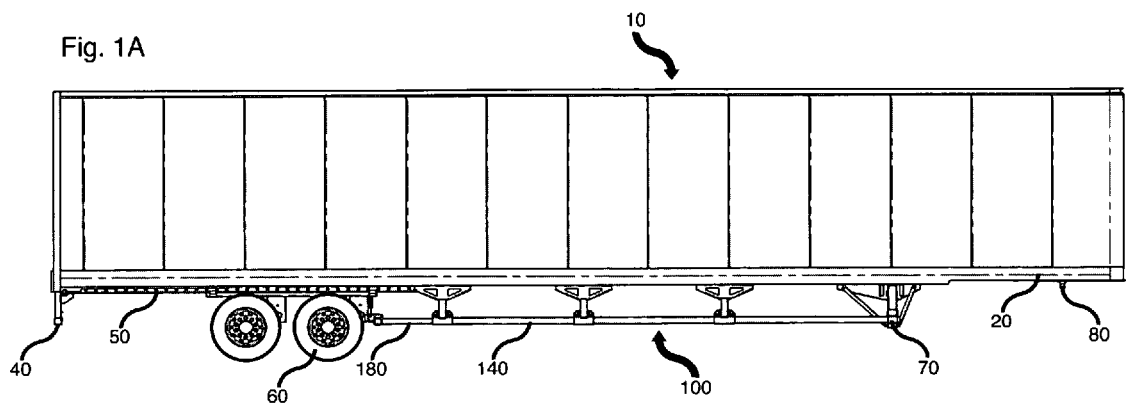
FIGS. 1A and 1B show profile schematic views of the inventive telescoping side under-ride guard system with the axle assembly in the forward and rearward positions.

The present invention relates generally to semi-trailers with sliding axles, such as van-type trailers. In particular, the present invention relates to an adjustable physical guard that addresses a portion of the impact hazard caused by geometric mismatch between the trailer and passenger vehicles. That is, when one passenger vehicles strike another, both vehicles are typically equipped with purpose-designed interacting structures to absorb the energy of the crash and to diminish occupant compartment space intrusion. Such structures include the front bumper, rear bumper, and the side-impact bars that are situated within the hinged occupant access doors. These energy absorbing structures are both mandated and regulated by federal statute, for example, FMVSS 208, Occupant Protection. For over the road commercial trailers, only one interacting aspect of the trailer is regulated and mandated to have collision contact-compatibility with passenger vehicles. That regulated aspect is the rear impact guard, commonly known as the ICC (International Commerce Commission) bar or ICC guard. The geometry and energy absorbing characteristics of this guard are regulated by the US Department of Transportation for the majority of commercial trailers by FMVSS 223, Rear Impact Guards, and FMVSS 224, Rear Impact Protection. These substantially planar and vertical guards are designed and constructed to provide a known minimum level of protection for impacting vehicles when they strike the rear of the trailer in a direction perpendicular to the guard. Prior to the mandatory incorporation of these guards into commercial trailers, the decapitation of occupants during rear under-ride collisions was a much more frequent occurrence. The guarding that is mandated for the rear of the trailer has never been extended analogously within North America to the side of the trailer, which presents the same geometric mismatch hazard during passenger automobile to trailer side impact as did historical trailer designs prior to incorporation of ICC bars. See generally Bloch, 1998, Trego, 2003, Cofone 2011, and Padmanaban, 2013. These four technical papers describe and analyze this traffic safety concern.

The present invention diminishes the consequences of impact for certain substantially lateral collisions into the trailer which occur wholly or partially forward of the sliding axle assembly and aft of the trailer landing legs. This invention addresses the largest linear segment of the geometric incompatibility hazard present within a substantial fraction, or majority, of U.S. commercial over-the-road trailers with respect to impacting passenger vehicles.

In order to reduce the typical geometric mismatch between laterally impacting passenger vehicles and the trailer's outboard floor edge, the volume embodied between the front of the sliding axle assembly tires and the landing legs is filled with an impact resistant telescoping side under-ride guard. Specifically, each side is equipped with a forward fixed rail segment into which a rear nesting sliding guard interfaces. Said guard system has vertical clearance from the bottom edge of the multiple guard rails to the travel surface to preserve the ability of the trailer to navigate non-planar surfaces, but is sufficiently close to the travel surface to prevent under-ride by the laterally impacting vehicle.

Figure 1B:
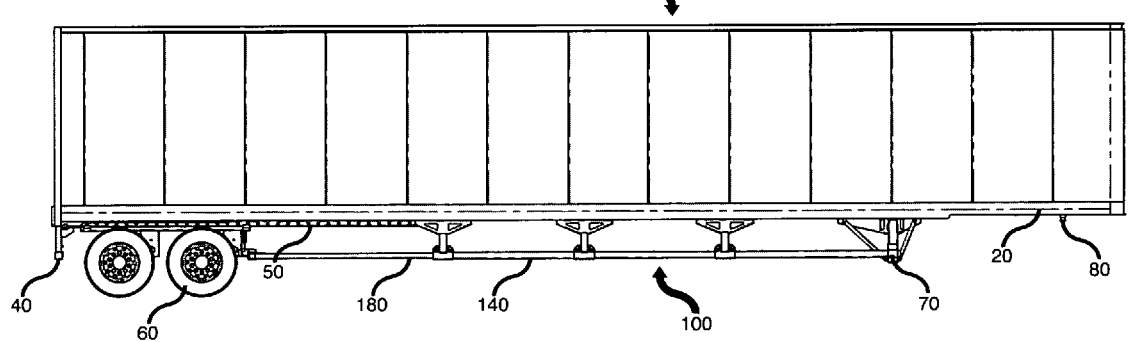

In FIG. 1A, a trailer 10 is shown with sliding axle assembly 60 in a forward position. Also shown in FIG. 1A is telescoping guard assembly 100 with the sliding guard segment 180 also in the forward most position. The same elements are shown in FIG. 1B, but in this depiction, the sliding axle assembly 60 is in the rearmost position and the telescoping guard assembly 100 is in the extended position providing the most linear coverage.

As shown in FIGS. 2A and 2B, the layout of the preferred embodiment of the mechanism is given from a more visually accessible viewpoint. The forward-most end of each fixed guard rail 140 is attached to the trailer's existing landing legs 70 which are located to the rear of the king pin 80 which removably connects the trailer to the prime mover, the tractor. The fixed side guard rail 140 is then supported by vertical and lateral members that will be described in greater detail in FIGS. 3 and 4. The axial endpoints of fixed side guard rails 140 coincide with the forward-most visible portion of sliding side guard rails 180. The side guard rails telescope inside of fixed guard rails 140 in the preferred embodiment. Sliding side guard rails 180 are attached to the axle assembly 60 through an intermediate transverse mount 190. This provides a convenience feature to the driver of the tractor-trailer combination; when sliding axle 60 is adjusted for axial position on sliding rails 50, the transverse mount 190 also moves necessarily, as sliding axle 60 and transverse mount 190 are mechanically joined. Thus, axle assembly 60, transverse mount 190 and the two sliding side rails 180 move as a unit. As described within this invention, the sliding guard rails 180 are not envisioned to require separate locks to maintain axial position, as this function is already resident within axle assembly 60.

Figure 3:
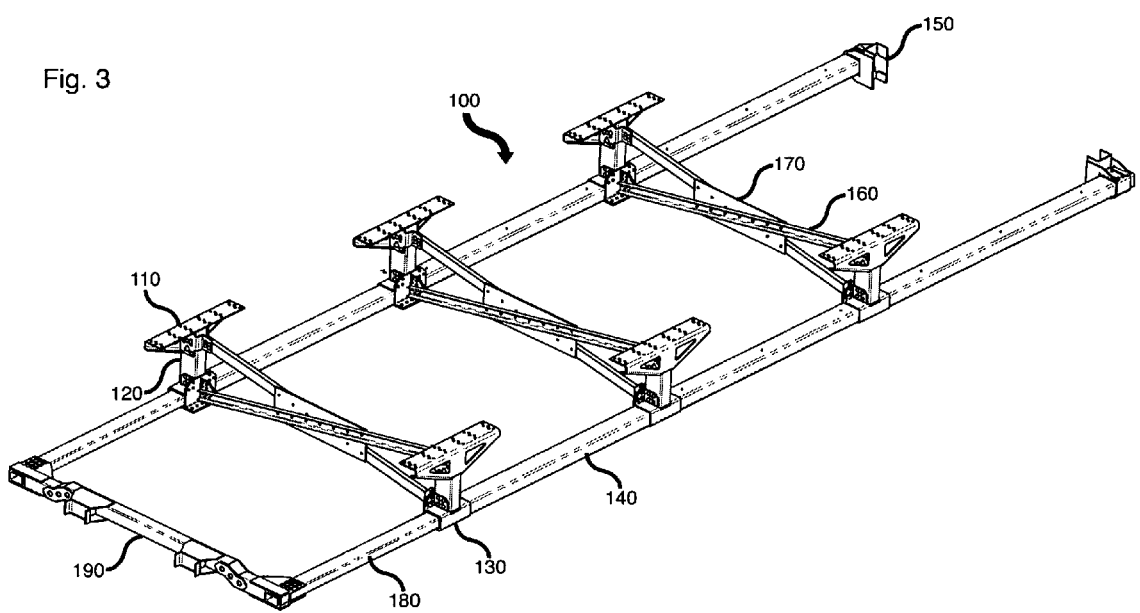
FIG. 3 shows the complete guard system in an assembled configuration but separate from the trailer.
Figure 4:
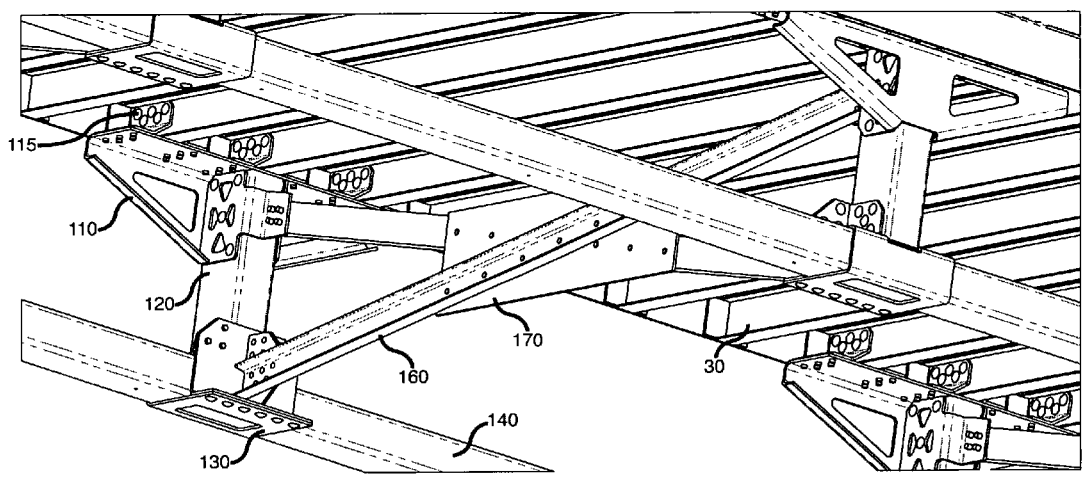
FIG. 4 gives a detailed as-installed view of a portion of the side guard system beneath the trailer.

FIG. 3 provides an oblique view of the present invention in detail; the invention is in the assembled condition but detached from the trailer. This oblique view shows the primary constituent elements of the mechanism but omits welds, attachment fasteners and upper bracket weldment rivet mount 115 which is shown in FIG. 4, and is not necessary in all embodiments of the invention. Note that in none of the drawings are small details of the design such as grease fittings, data plate(s), accessory mounting points, stickers, etc., depicted. Conceptually, to install the telescoping side guard rail 100, first the six upper bracket weldments 110 are attached at their proper locations beneath the transverse floor beams 30 (metallic joists) that support the trailer floor 20. Note that the term "weldment" in this case means that a complex component has been assembled by a welding process from separate sub-components; the term "weldment" does not mean that said component is then necessarily welded to other details of the invention or to the trailer. These upper bracket weldments 110 are either welded or mechanically fastened with bolts, screws, or rivets, to the trailer floor, typically at the transverse floor beams 30. Each upper bracket weldment 110 accepts a single down tube 120 which provides the desired offset of the guard segments 140 and 180 from the travel surface. In the preferred embodiment, the down tubes are fastened mechanically using rivets in order to allow minimally skilled worker installation and the capability to repair the system in the event of repair. To each down tube 120 is then mounted a lower bracket weldment 130. The upper and lower bracket weldments 110 and 130 at the upper and lower ends of each down tube 120 act as mounting points for cross braces 160. Each cross brace attaches one upper weldment bracket 110 to the companion lower bracket weldment 130 located at the transverse side of the trailer. The cross braces 160 transfer impact loads from the impacted guard segment to the companion guard segment. Each of the three cross brace pairs 160 are reinforced by a centrally mounted shear plate 170 to diminish buckling failure during compression loading. These rectangular-shaped shear plates 170 are riveted, screwed or bolted to the cross braces 160. On each side of the trailer through the three lower bracket weldments 130 is inserted fixed side guard rail 140. This rectangular cross section rail is constructed of a wrought aluminum alloy for impact resistance at a favorable strength to weight ratio and corrosion resistance. The forward end of each fixed side guard rail 140 is affixed to a landing gear bracket weldment 150 which is purpose designed to attach to the existing trailer landing leg assembly 70. Thus, the trailer landing legs 70 are given an additional function in supporting the telescoping side guard rail 100 with no consequential weight penalty. Each fixed side guard rail 140 stops flush, or somewhat past, the aft-most lower bracket weldment. The end of each fixed side guard rail 140 acts as the entry point for each sliding side guard rail 180. This entry point enables the telescoping function. The rearward end of each sliding side guard rail 180 is attached to transverse mount 190. This transverse mount 190 must be purpose designed to attach directly to the front of axle assembly 60 such that when the axle assembly is moved on the several trailer slide rails 50, the telescoping function of the telescoping side guard rail is manifested.

FIG. 4 shows another view of the invention for clarity. In this view, the upper bracket weldments' mounting points on the transverse floor beams 30 are shown. This embodiment of the invention shows the upper bracket weldments 110 riveted to the transverse floor beams 30, rather than welded. To efficiently accomplish this fixation, upper bracket weldment rivet mounts 115 are used. The number of upper bracket rivet mounts 115 which are required is a function of the geometry of transverse floor beam 30 spacing and width of each upper bracket weldment 110.

Figure 5:
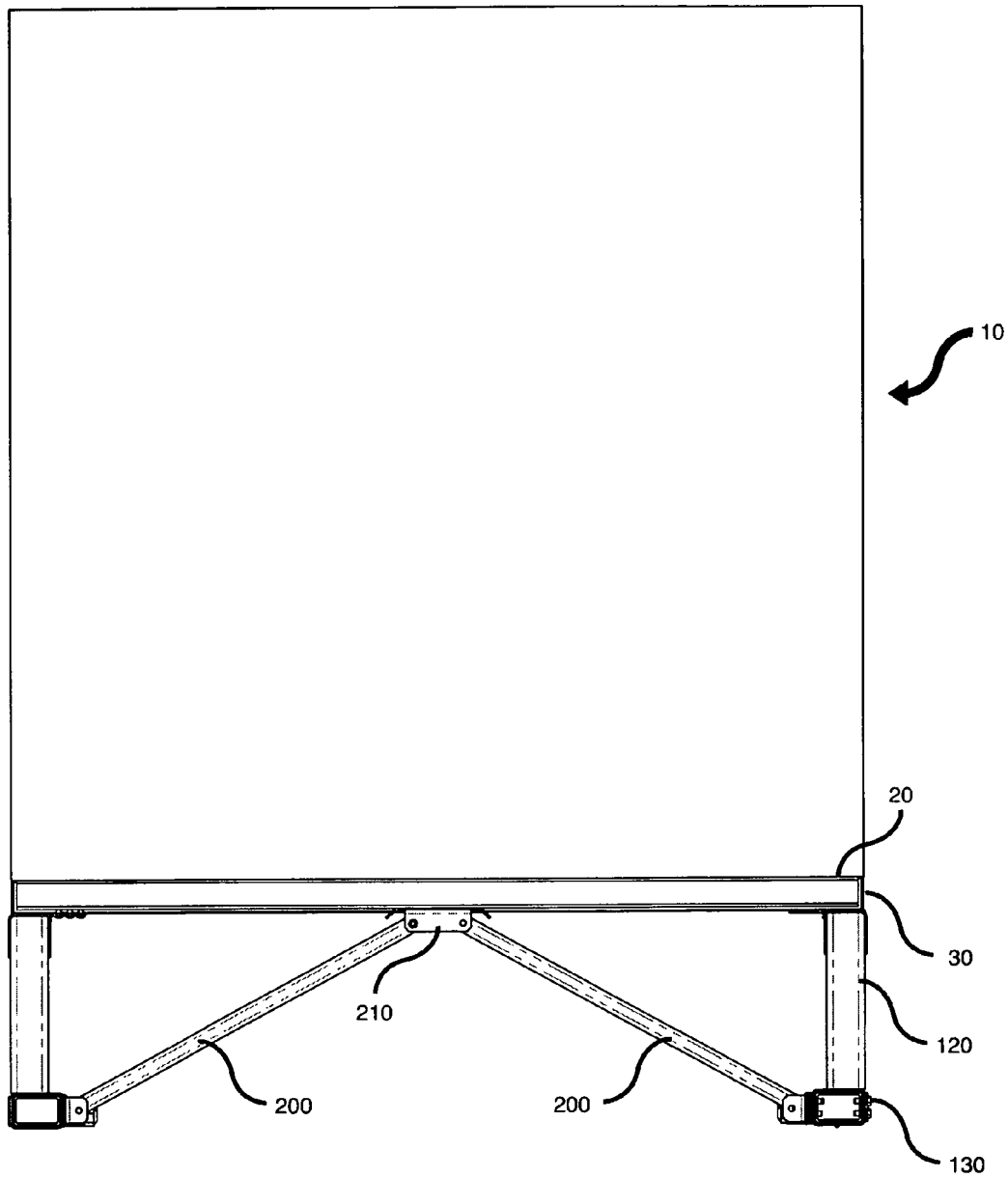
FIG. 5 shows a cross-sectional rear view of the trailer with an alternative embodiment of the telescoping side under-ride guard incorporating floor braces rather than the cross braces which are present in the preferred embodiment.

FIG. 5 shows an alternative embodiment of the instant invention. In this embodiment, the six cross braces 160 and three shear plates 170 are deleted and replaced with a plurality of floor braces 200 that connect the lower bracket weldments 130 to the approximate or actual centers of one or more transverse floor beams 30 using floor brace brackets 210. This similar but distinct design redirects guard rail impact force to the trailer floor, rather than to the companion side guard components. An additional benefit of this embodiment is that the trailer floor 20 can be stiffened as a result of using floor braces 200.

Although the preferred embodiment of the invention is shown in the several illustrations, this patent addresses the function of guarding a particular space and envisions various other similar but distinct embodiments that are likewise capable of addressing the bilateral unguarded space forward of the trailer's axle assembly and rearward of the trailer landing legs. These include:

1. The shapes of the individual parts as shown in the preferred embodiment were chosen to have an efficient strength for the components used. Other component shapes can also be used, but the general perimeter of the interaction surface at the exterior of the guard should retain the generally linear surface that is generally parallel to the travel surface.
2. Wrought aluminum alloys are envisioned for the majority of components for their light weight, high strength, and corrosion resistance, but other materials such as steel and composites could also serve the purpose of the aluminum.
3. The drawings depict weldments for the various brackets, while other construction techniques, such as castings and powder metallurgy are also specifically envisioned.
4. The drawings show mechanical fasteners as the attachment method of choice, though fusion welding, friction stir welding and crimping is also envisioned.
5. The term "telescoping" is used in this patent application in its broadest sense, synonymously with terms such as extendable, extensible, and permitting expansion. It is envisioned that substantially linear guard shapes other than closed box sections could be used for various components of the telescoping guard assembly 100. In that case, the component members (such as a pair of W-shaped beams) may overlay or exist in close proximity to each other, rather than one member being positioned inside the other.
6. Although three mounting points per side of the fixed guard are envisioned, fewer or more mount assemblies could be used.
7. The preferred embodiment extends the sliding side guard rail 180 automatically with relocation of the trailer axle assembly; it is not repositionable by hand. However, another embodiment of the invention has the transverse mount 190 detached from the axle assembly 60, requiring a separate mechanism, such as the operator, to relocate the sliding guard. It is also possible that a power source independent of the carriage could be used to reposition the guards without substantial physical effort by the operator. In this embodiment, a separate physical locking mechanism to prevent unwanted motion is required.

What is claimed:

1. A side under-ride collision guard configured to be mounted on a large trailer equipped with a sliding rear axle and having a plurality of floor beams, comprising:
    a plurality of linear fixed energy absorbing beam structures mounted axially with said trailer, said beam structures attached to a plurality of support members connecting said beam structures to opposing ends of said trailer's floor beams, and
    a plurality of linear telescoping beam structures axially adjustable for position with respect to said fixed beam structures.

2. A side under-ride guard in accordance with claim 1, in which said support members are connected to opposing ends of a plurality of said trailer's floor beams.

3. A side under-ride guard in accordance with claim 2, in which said support members are connected to opposing ends of three or more of said trailer's floor beams.

4. A side under-ride guard in accordance with claim 1, in which said adjustable beam structures are connected to an axle assembly of said trailer by a transverse mount.

5. A side under-ride guard in accordance with claim 1, wherein said support members include shear plates.

6. A side under-ride guard in accordance with claim 1, wherein said beam structures are fabricated from wrought aluminum alloy.

7. A side under-ride guard in accordance with claim 1, wherein said support members redirect support member impact forces to said trailer's floor.

8. A side under-ride guard system for a sliding axle trailer, comprising:
    a plurality of fixed energy absorbing guards beneath said trailer's floor forward of said trailer's sliding axle assembly and rearward of said trailer's landing legs, a plurality of movable energy absorbing guards between said sliding axle assembly and said plurality of fixed energy absorbing guards, and wherein said fixed beam structures are attached to a plurality of support members connecting said fixed beam structures to opposing ends of said trailer's floor beams.

9. A side under-ride guard in accordance with claim 8, in which said moveable side guards nest inside of the fixed side guards.

10. A side under-ride guard system in accordance with claim 8, in which said fixed side guards attach to said trailer's landing legs.

11. A side under-ride guard system in accordance with claim 8, in which said support members do not connect to said trailer's floor.

12. A side under-ride guard system in accordance with claim 8, in which said support members are connected to said trailer's floor.

13. A side under-ride guard system in accordance with claim 1, wherein said fixed linear guard members are fabricated from an aluminum alloy.

14. A side under-ride guard in accordance with claim 8, in which said support members are connected to opposing ends of a plurality of said trailer's floor beams.

15. A side under-ride guard in accordance with claim 2, in which said support members are connected to opposing ends of three or more of said trailer's floor beams.

16. A side under-ride guard in accordance with claim 8, in which said adjustable beam structures are connected to an axle assembly of said trailer by a transverse mount.

17. A side under-ride guard in accordance with claim 8, wherein said support members include shear plates.

18. A side under-ride collision guard configured to be mounted on a large trailer equipped with a sliding rear axle and having a plurality of floor beams, comprising:

a plurality of linear fixed energy absorbing beam structures mounted axially with said trailer, said beam structures attached to a plurality of support members connecting said beam structures to opposing ends of said trailer's floor beams, and a plurality of linear telescoping beam structures axially adjustable for position with respect to said fixed beam structures;

and wherein said support members are connected to opposing ends of three or more of said trailer's floor beam;

said adjustable beam structures are connected to an axle assembly of said trailer by a transverse mount; and said support members include shear plates.

* * * * *